United States Patent Office 3,457,261
Patented July 22, 1969

3,457,261
THIOPHENYLPYRIDYL AMINE, CHLOROTHIO-
PHENYLPYRIDYL AMINE, THEIR SALTS AND
PREPARATION
Wilhelm A. Schuler, Bad Homburg, and Hans Klebe,
Gelnhausen, Germany, assignors to Deutsche Gold- und
Silber-Scheideanstalt vormals Roessler, Frankfurt am
Main, Germany
No Drawing. Original application Sept. 30, 1955, Ser. No.
537,896. Divided and this application Sept. 19, 1960,
Ser. No. 56,702
Claims priority, application Germany, Oct. 2, 1954,
D 18,788, D 18,789
Int. Cl. C07d 93/16; A61k 27/00
U.S. Cl. 260—243                                    4 Claims The present invention relates to a new class of compounds, namely thiophenylpyridyl amines of the general formula

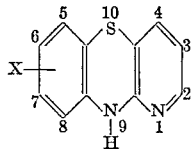

wherein X=hydrogen or chlorine and their non-toxic salts such as their hydrochlorides as well as to a process for their production.

According to the invention it was found that these compounds can be prepared by introducing a sulfur atom into a phenylpyridyl amine of the general formula

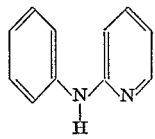

with the splitting off of two hydrogen atoms.

It was found that this introduction of the sulfur atom expediently could be effected by reacting phenylpyridyl amine with sulfur at elevated temperatures. Preferably, such reaction is carried out in the presence of catalysts such as iodine, aluminum chloride, boron fluoride and the like. The reaction advantageously can be carried out in the presence of a solvent.

Instead of elemental sulfur, sulfur compounds can also be employed which can form the sulfur bridge between pyridine and phenyl radicals under the reaction conditions employed. Examples of such sulfur compounds are sulfur monochloride (SCl, $SC_2I_2$), sulfur dichloride ($SCl_2$), sodium thiosulfate, antimony sulfide, arsenic sulfide alkali metal polysulfides, and similar compounds. The phenylpyridyl amines also can be used in the form of their salts, for example, when sodium thiosulfate is employed as the sulfur donor.

The new compounds can be directly used as medicaments, such as, for example, as vermicides, furthermore they are valuable intermediates for the production of pharmaceuticals, such as in the production of the N9-dimethyl amino isopropyl thiophenyl pyridyl amine, by reaction with dimethyl amino isopropyl chloride as described in copending application Ser. No. 537,896, filed Sept. 30, 1955, now U.S. Patent 2,974,139, of which this application is a division.

The following examples will serve to illustrate several embodiments of the invention:

Example 1

85 parts of phenylpyridyl amine, 21 parts of powdered sulfur and 1.7 parts of iodine were heated to 275° C. for two hours. Evolution of hydrogen sulfide began when the mixture reached a temperature of 250° C. and became vigorous when it reached 275° C. Such evolution of hydrogen sulfide diminished after about 1 hour at 275° C. A light oil was distilled from the reaction mixture under vacuum (pressure=2–3 mm. Hg). This oil which contained phenylpyridyl amine in addition to the thiophenylpyridyl amine was then treated at boiling temperature with approximately the theoretical amount of 2–3 normal HCl until complete solution resulted with formation of the HCl salts of the amines. The solution was then treated with 1 to 2% (based upon the substance mixture) of active carbon and then filtered hot. The filtrate was then cooled to 0° C. whereupon the thiophenylpyridyl amine hydrochloride crystallized out while the phenylpyridyl amine hyrochloride remained in solution. The thiophenylpyridyl amine hydrochloride was filtered off and suspended in water and the pH adjusted with half concentrated ammonia to 8. The thiophenylpyridyl amine set free was filtered off and dried. It was in the form of gold yellow needles and had a melting point of 114–115° C. The phenylpyridyl amine was recovered from the hydrochloride solution by treatment with concentrated ammonia.

It was found that not more than the theoretical quantity of sulfur should be employed for the reaction and that the best yields of thiophenylpyridyl amine were obtained when only about ⅔ of the theoretical amount of sulfur was employed. It was also found that the reaction period should not be extended too long. For example, when the reaction mixture was heated for six hours at 255–260° C. instead of two hours at 275° C., the yield of thiophenylpyridyl amine was noticeably decreased and the distillation residue increased.

The efficiency of the hydrochloric acid method of separating the thiophenylpyridyl amine from the phenylpyridyl amine is illustrated by the fact that when a mixture of 20 grams of thiophenylpyridyl amine and 20 grams of phenylpyridyl amine were separated thereby in the manner described above, 19.5 grams (97.5%) of the thiophenylpyridyl amine were isolated and 18.5 grams (93%) of the phenylpyridyl amine were isolated. While the sulfuric acid salts of both amines have solubilities in water similar to the hydrochloride salts, the sulfuric acid salt of thiophenylpyridyl amine separates out only as an oily liquid which is crystallized only with difficulty. Consequently, therefore, while sulfuric acid and other strong mineral acids can be employed to effect the separation, hydrochloric acid is preferred.

Example 2

85 parts of phenylpyridyl amine, 32 parts of sulfur and 15 parts of aluminum chloride were heated for three hours at 270° C. The reaction product was then directly distilled under vacuum. The resulting light oil which distilled over was then dissolved in ethanol and after admixing the solution with active carbon it was filtered and the thiophenylpyridyl amine was crystallized out of the filtrate as gold yellow needles with a M.P. of 114–115° C.

Example 3

52 parts of phenylpyridyl amine hydrochloride were heated with 80 parts of anhydrous sodium thiosulfate. Hydrogen sulfide evolution began at 280° C. and this temperature was maintained for 7–8 hours. The resultant product was then vacuum distilled and treated as in Example 2 to recover the thiophenylpyridyl amine.

Example 4

85 parts of phenylpyridyl amine were dissolved in 900 parts of benzene. Thereupon a solution of 54 parts of sulfur dichloride in 150 parts of benzene were slowly dropped in with ice cooling of the reaction mixture. A greenish yellow precipitate was produced. After all of the sulfur dichloride had been added, the reaction mixture was heated for two hours at 60° C. and then refluxed for a further hour. At about 80° C., HCl escaped from the reaction vessel. After removal of the reflux condenser, the benzene was distilled off and the residue distilled under vacuum. The resultant product was then treated as in Example 2 to recover the thiophenylpyridyl amine. Similar results were obtained when the sulfur dichloride was replaced by $S_2Cl_2$.

Example 5

15 parts of 3-chlorophenyl amino pyridine were heated with 4.7 parts of sulfur and 0.1 part of iodine. The evolution of hydrogen sulfide began at 240° C. and after such evolution had ceased the reaction product was distilled under vacuum. The oily distillate was dissolved in alcohol and recrystallized therefrom. After two recrystallizations, the 7-chloro-thiophenylpyridyl amine produced had a melting point of 166° C.

We claim:

1. A thiophenylpyridyl amine compound selected from the group consisting of compounds of the formula

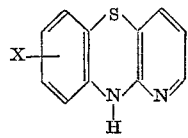

wherein X is selected from the group consisting of H and chlorine, their hydrochlorides and their sulfates.

2. A thiophenylpyridyl amine compound of the formula

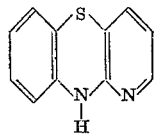

3. In a process for separating a thiophenylpyridyl amine compound of the formula

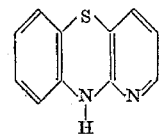

from its admixture with a phenylpyridyl amine of the formula

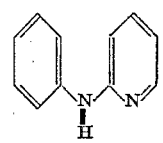

the steps which comprise dissolving such admixture in an aqueous solution of a strong mineral acid selected from the group consisting of hydrochloric acid and sulfuric acid and crystallizing the salt of said thiophenylpyridyl amine from said solution.

4. The process of claim 3 in which said mineral acid is hydrochloric acid.

References Cited

FOREIGN PATENTS 549,055  12/1956  Belgium.

JOHN D. RANDOLPH, Primary Examiner

U.S. Cl. X.R.

260—999